(12) United States Patent
Ben Rhouma et al.

(10) Patent No.: US 6,237,438 B1
(45) Date of Patent: May 29, 2001

(54) ELECTRICALLY CONTROLLED CLAMPING SYSTEM

(75) Inventors: Abdel Karim Ben Rhouma, Vendome; Thomas Robin, Aze, both of (FR)

(73) Assignee: Lemfördes Nacam SA, Vendome (FR)

( * ) Notice: Subject to any disclaimer, the term of this patent is extended or adjusted under 35 U.S.C. 154(b) by 0 days.

(21) Appl. No.: 09/348,020

(22) Filed: Jul. 6, 1999

(30) Foreign Application Priority Data

Jul. 13, 1998 (FR) .................................................. 98 09023

(51) Int. Cl.[7] ........................................................ B62D 1/16
(52) U.S. Cl. ................................................. 74/492; 74/493
(58) Field of Search ....................... 74/492, 493; 280/775

(56) References Cited

U.S. PATENT DOCUMENTS

| 4,541,298 | 9/1985 | Strutt . |
| 5,678,454 | * 10/1997 | Cartwright et al. ................. 74/493 |
| 5,769,454 | 6/1998 | Duval et al. . |
| 5,769,455 | 6/1998 | Duval et al. . |
| 5,816,615 | 10/1998 | Dupont et al. . |
| 5,927,152 | 7/1999 | Marzio et al. . |

FOREIGN PATENT DOCUMENTS

| 3409987 | 9/1985 | (DE) . |
| 4016163 | 11/1991 | (DE) . |
| 2687628 | 8/1993 | (FR) . |
| 2690403 | 10/1993 | (FR) . |

* cited by examiner

*Primary Examiner*—Lenard A. Footland
(74) *Attorney, Agent, or Firm*—Laubscher & Laubscher (57) ABSTRACT

In a system for adjusting the position of a first member relative to a second, support member regarded as fixed, the support member comprises a base having an upright at each of its two ends. The first member is inside the two uprights of the support member and the uprights are substantially parallel to the axis of the first member. The position adjustment system is locked in a chosen position by a clamping device, whose component parts are mounted on a clamping rod passing through the two uprights and whose axis is the clamping axis, which is substantially perpendicular to the axis of the first member. The clamping device includes a cam-type immobilizing system outside one of the uprights, relative to the axis of the first member, between an outside face of that upright and a bearing member joined and substantially perpendicular to the clamping rod; a bearing member joined and substantially perpendicular to the clamping rod; a circular fixed cam prevented from rotating with respect to the upright of the support member and a circular mobile cam free to rotate on the clamping rod. The cam-type immobilizing system is locked or unlocked by an electrical remote control system.

25 Claims, 5 Drawing Sheets

ELECTRICALLY CONTROLLED CLAMPING SYSTEM

BACKGROUND OF THE INVENTION

1. Field of the Invention

The present invention relates to an electrically controlled clamping device for a system for adjusting the position of a first member relative to a second member regarded as fixed. The clamping device has a clamping axis substantially perpendicular to the axis of the first member. The clamping device for a position adjustment system is applicable in particular to a steering column of an automobile vehicle, the steering column being adjustable in height and/or in depth in the vertical plane.

2. Description of the Prior Art

There are steering columns which can be adjusted in height or in depth, or in height and depth, which have a system for adjusting the steering columns relative to a support member joined to the bodyshell of the automobile vehicle. The position adjustment system is provided with a clamping device with two positions: an unlocked position to enable adjustment of the steering column to the required position, and a locked position once that position has been chosen.

In prior art systems, the clamping device of the system for adjusting the steering column of the automobile vehicle has a clamping rod axis below the first member or body-tube of the steering column. The clamping device has an operating handle and a locking system, for example using cams, disposed at one end of the clamping rod. The clamping rod passes through the two uprights of the second member which is regarded as fixed.

This type of assembly has overall dimensions that are inconvenient for the driver and above all dangerous in the event of an accident because it requires a clamping rod disposed very low down under the steering column with an operating handle that can impact on the driver's body in the event of an impact.

Accordingly, the present invention was developed to provide a clamping device which avoids the drawbacks described above and whose operating system can be disposed away from the environment of the steering column so as to free up the area below said steering column.

A primary object of the present invention is to provide a clamping member has an inverted U-shaped configuration including a horizontal base portion and a pair of vertical parallel spaced downwardly depending leg portions between which the first member is pivotally mounted on a clamping rod. Clamping means are provided for displacing the leg portions together in clamping engagement with the first member, thereby to clamp the first member in a given position of angular adjustment relative to the fixed support member. In a first embodiment, the clamping means includes a pair of collinearly arranged disk-shaped cam members coaxially mounted on the stationary clamping rod, the adjacent faces of the cams being provided with cam teeth that axially separate the cam disks when the cam disks are rotated relative to each other, whereby the leg portions of the fixed support are displaced toward each other to clamp the movable member therebetween. In a second embodiment, a clamping nut is threadably mounted on the stationary clamping rod for forcing the legs together into clamping engagement with the movable member.

The clamping device includes a cam-type immobilizing system arranged outside one of the uprights relative to the axis of the first member, between an outside face of said upright and a bearing member joined and substantially perpendicular to the clamping rod.

In accordance with a further object of the invention, it is particularly beneficial to provide a system supplying information on the locked or unlocked status of said clamping device, which is triggered by remote control of the electromechanical energy converter.

According to another object of the invention, speed reducer means are provided for driving the cam means from electromechanical energy converter means.

In one variant of the invention, the clamping reducer and the electromechanical energy converter form a single system and the clamping reducer is free to rotate on the clamping rod.

In another variant of the invention, the clamping reducer and the electromechanical energy converter are rotationally linked by a mechanical motion transmission system so that the electromechanical energy converter can be placed at the required location and the clamping reducer is free to rotate on the clamping rod.

In the latter case, the mechanical motion transmission system is a flexible cable in a sheath supported at one end by the electromechanical energy converter and at the other end by the casing of the clamping reducer.

In another type of embodiment, the speed reducer system includes two speed reducers:

a speed reducer referred to as the clamping reducer which drives rotation of the clamping device and is mounted to rotate freely on the clamping rod; and a speed reducer referred to as the converter reducer which is driven directly by the electromechanical energy converter.

In one variant of the invention, the clamping reducer, the converter reducer and the electromechanical energy converter form a single system and the clamping reducer is free to rotate on the clamping rod.

In another variant of the invention, the clamping reducer, on the one hand, and the converter reducer with In another case, the electromechanical energy converter is remotely controlled by the ignition key of the automobile vehicle.

In accordance with the invention, the system

In accordance with the invention, one embodiment of the clamping reducer and the immobilizing system is achieved as described hereinafter. In this embodiment, the clamping device includes a clamping rod with a nut which is locked or unlocked by an electrical remote control system.

The clamping rod has a bearing member joined to and substantially perpendicular to the clamping rod outside one of the uprights and against an outside face of that upright. Said clamping rod is prevented from rotating about the clamping axis by the bearing member. The clamping rod has at its other end a screwthreaded part which cooperates with the nut which is outside the other upright. The nut is locked or unlocked by the electrical remote control system.

The bearing member is the nut mounted and screwed

A particularly beneficial application of the invention is to an automobile vehicle steering column in which the first member is the body tube with its reinforcing bracket and the support member is mounted on the bodyshell of the vehicle.

The electrically controlled clamping device of an automobile vehicle steering column in accordance with the invention therefore has the advantage of having an operating system that is outside the immediate environment of the steering column, which frees up the area below the steering column. Also, this remotely controlled clamping device can easily be fitted to existing steering columns.

BRIEF DESCRIPTION OF THE DRAWINGS

Further features and advantages of the invention will be apparent from the following particular description of several preferred embodiments of the invention illustrated by the corresponding accompanying drawings, in which.

DETAILED DESCRIPTION

Figure 1:
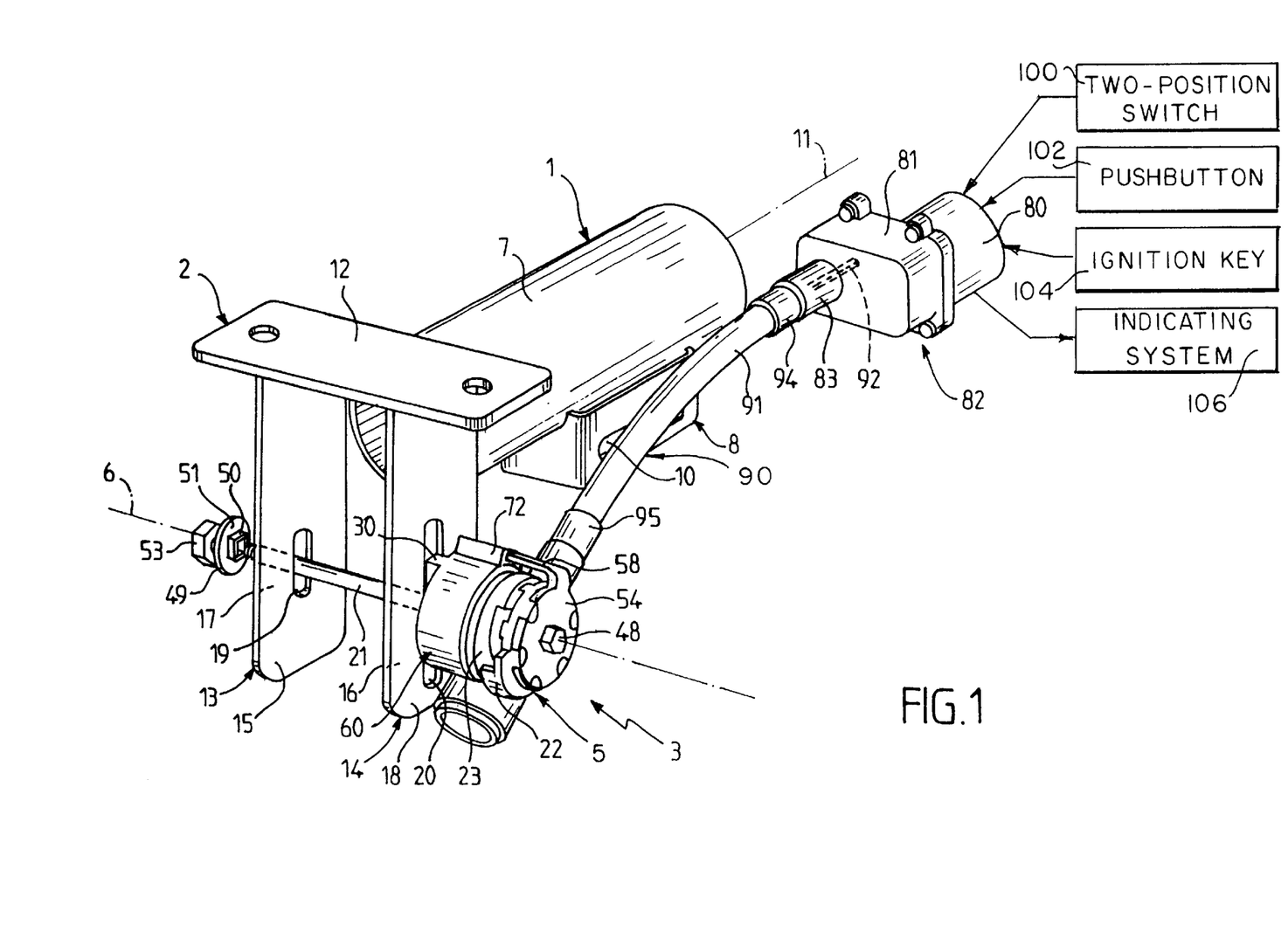
FIG. 1 is a perspective exploded view of the whole of the electrically controlled clamping device of the invention.

The clamping device of the invention relates to a system for adjusting the position of moveable member 1 relative to a fixed generally U-shaped inverted support member 2, in the manner shown in FIG. 1. The member 1 is an automobile vehicle steering column body-tube 7 in which the steering shaft is rotatably mounted. The support member 2 is joined to the bodyshell of the automobile vehicle and is regarded as fixed. The support member 2 comprises a base 12 which has a respective downward depending vertical leg 13, 14 at each end. The member 1, which has an axis 11, is arranged inside the two uprights 13 and 14 of the support member 2. The legs 13 and 14 are substantially parallel to the axis 11 of the member 1. In the remainder of the description, and for the same member, internal relative to the axis 11 of the member 1 means nearer the axis 11 and external means farther away from it. Thus relative to the axis 11 the leg 13 of the support member 2 has an inside face 15 and an outside face 17. Similarly, relative to the same axis 11, the leg 14 has an inside face 16 and an outside face 18. Also, the leg 13 has a slot 19 oriented in the adjustment direction of the position adjustment system. The leg 14 also has a slot 20 which is likewise oriented in the adjustment direction.

The position adjustment system is locked in a chosen position by the clamping device 3 whose axis 6 is substantially perpendicular to the axis 11 of the member 1.

The various component parts of the clamping device 3 are mounted on a clamping rod 21 whose axis is the axis 6. The clamping rod 21 passes successively through the slot 19 of the leg 13 the opposed slots 10 of the reinforcing bracket 8 of the steering tube 7, and the slot 20 of the leg 14 of the support member 2 and the slot 9 and the slot 10 of the reinforcing bracket 8 that is part of the body tube 7.

The clamping device 3 of the invention essentially includes a clamping system with cam means 5 which are locked or unlocked by a remote control system.

In the various embodiments shown in FIGS. 1, 2, 3, 5 and 6 the cam-type immobilizing system 5 is arranged outside the leg 14 relative to the axis 11 of the member 1. The cam-type immobilizing system 5 includes:

a circular fixed cam 22 prevented from rotating with respect to the upright 14 of the support member 2; and a circular movable cam 23 free to rotate on the clamping rod 21.

Figures 4, 5, 6:
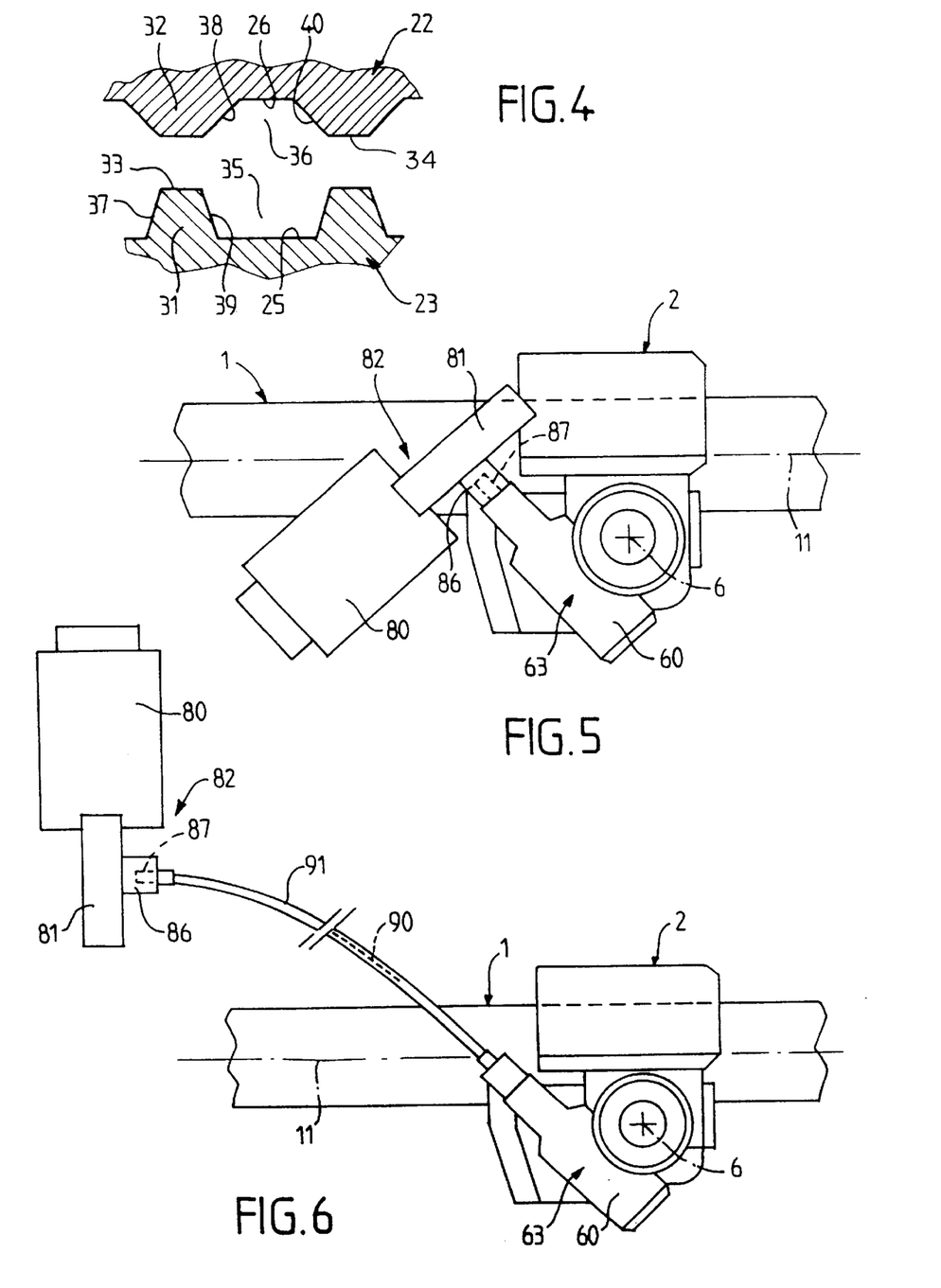
FIG. 4 is a sectional view showing the cams from FIG. 2.
FIG. 5 is an overall view of a steering column provided with the clamping device shown in FIG. 3.
FIG. 6 is an overall view of a steering column fitted with the clamping device shown in FIG. 1.

As shown in detail in FIG. 4, the fixed cam 22 has teeth 32 each of which comprises a peak 34 and a valley 36, with two flanks 38 and 40. Each of the flanks 38 and 40 has a slope which is adapted to load the clamping device 3 progressively.

The number of teeth 31 on the movable cam 23 is the same as the number of teeth 32 on the fixed cam 22. Each tooth 31 of said mobile cam 23 has a peak 33 and a valley 35, with two flanks 37 and 39. Each of the flanks 37 and 39 is adapted to cooperate with the corresponding flanks 38 and 40 of the fixed cam 22 to assure the unlocked position and to cooperate with the corresponding flank 38, 40 of the fixed cam 22 to load the clamping device 3 progressively.

The width of the peak 33 of the tooth 31 of the movable cam 23 cooperates with the width of the corresponding valley 36 of the fixed cam 22 in the unlocked position. The corresponding peaks 33 and 34 cooperate in the locked position, thereby to separate the cam members and effect displacement of the legs 13 and 14 together into clamping engagement with the movable member 1, as will be described in greater detail below.

Figure 2:
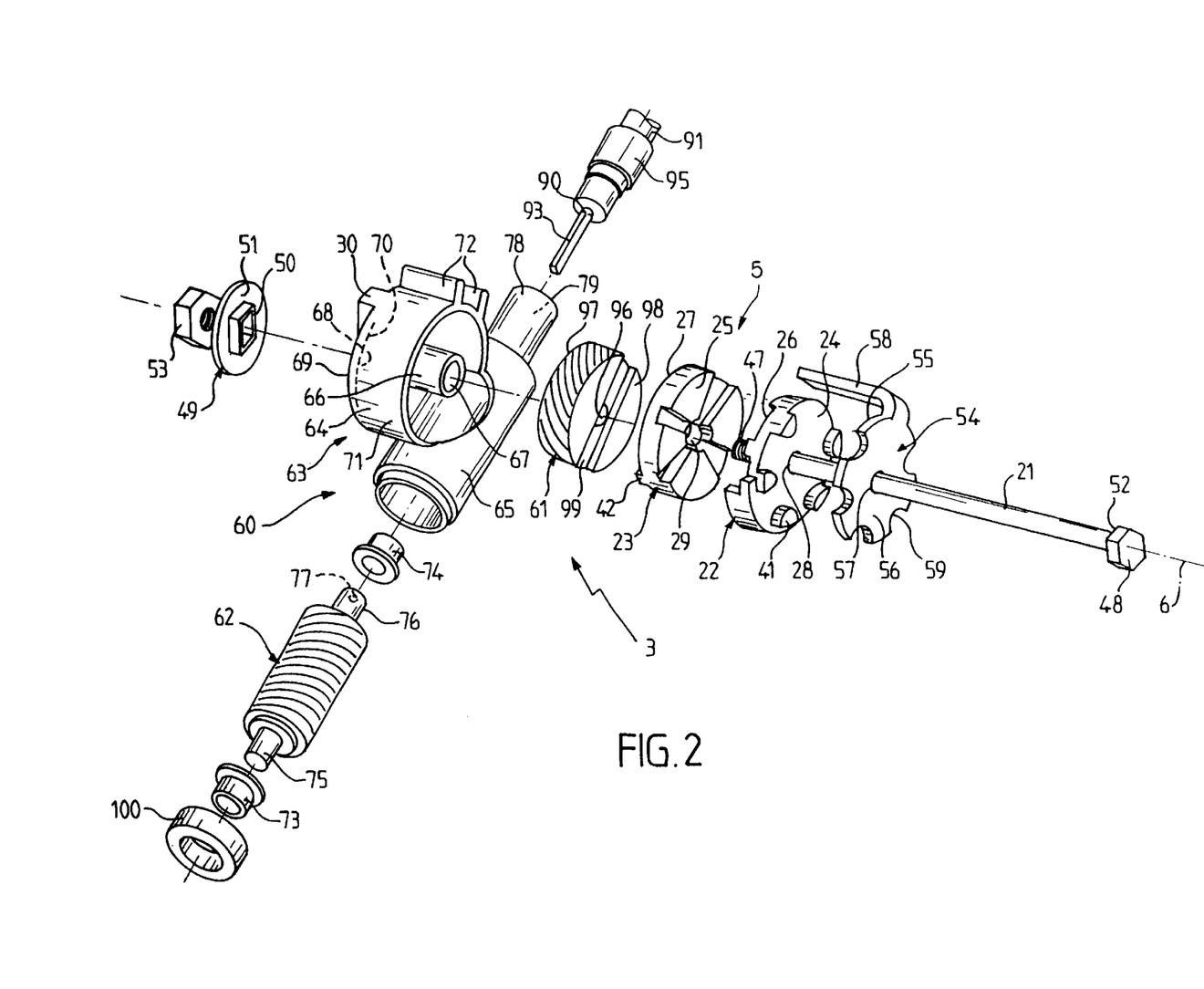
FIG. 2 is an exploded perspective view corresponding to FIG. 1.

In the embodiment shown in FIGS. 1 and 2, the clamping device 3 includes a cam-type immobilizing system 5 which is locked and unlocked by an electrical remote control system.

The cam-type immobilizing system 5 is outside the upright 14 of the support member 2, between an outside face 18 of that leg 14 and a bearing member 48 which is joined to and substantially perpendicular to the clamping rod 21.

The clamping device 3 has, outside the other leg 13, and against an outside face 17 of said leg 13, another bearing member 49 which is joined to and substantially perpendicular to the clamping rod 21.

In this type of assembly, the bearing member 48 is a flange at the end of the clamping rod 21. The bearing member 49 is a washer which is retained and adjusted by a nut 53. The nut 53 is screwed onto the screwthreaded other end 47 of the clamping rod 21. The bearing member 49 further includes a guide tongue 50 in the slot 19 of the upright 13. The bearing face 51 of the bearing member 49 is pressed against the outside face 17 of the leg 13. The fixed cam 22 has an inside face 26 with the teeth 32 on it. The movable cam 23 has an outside face 25 with the teeth 31 on it.

The fixed cam 22 has a hole 28 in it through which the clamping rod 21 passes and the movable cam 23 has a hole 29 in it through which the clamping rod 21 passes.

The electrical remote control system includes:

a reducer system that drives rotation of the movable cam 23;

an electromechanical energy converter 80 which converts electrical energy into mechanical energy and which imparts the required rotary movement to the reducer system; and a remote controller for the electromechanical energy converter 80.

The electromechanical energy converter 80 is remote controlled by an electrical switch 100 (FIG. 1). The electrical switch has two positions:

a rest position, and an active position which locks the clamping device 3 when it is in the unlocked position or which unlocks said clamping device 3 when it is in the locked position.

In another embodiment of the invention, the electromechanical energy converter 80 is remote controlled by a pushbutton. The pushbutton has a non-depressed position which is its rest position. Each depression of the pushbutton triggers a change of state of the clamping device 3, that is to say:

when it is in the unlocked position, depressing the pushbutton locks the clamping device 3, and when it is in the locked position, depressing the pushbutton unlocks the clamping device 3.

In a further embodiment of the invention the electromechanical energy converter 80 is remote controlled by the ignition key of the automobile vehicle.

Moreover, the electrically controlled device 3 of the invention is equipped with an indicating system 106 which advises the conductor as to the status of the clamping device 3; in other words, it indicates the locked or unlocked position of said clamping device 3. The indicating system 106 is triggered by the electrical remote controller of the electromechanical energy converter 80.

The system providing indication of the locked or unlocked position of the clamping device 3 is a visual system employing a luminous signal, such as an indicator lamp, for example.

In another embodiment of the invention the system providing information on the locked or unlocked position of the clamping device 3 is a visual system employing a written message on a screen.

In the embodiments shown in FIGS. 1, 3, 5 and 6 the electromechanical energy converter 80 is an electric motor.

In other embodiments of the invention, the electromechanical energy converter 80 is an electromagnetic system.

As explained below, in the description of FIGS. 1, 2, 5 and 6, the speed reducer system of the invention can have different constructions.

In a first type of embodiment of the invention, the speed reducer system includes a single speed reducer system referred to as the clamping reducer 60. The clamping reducer 60 drives rotation of the movable cam 23 and the clamping reducer 60 is mounted to rotate freely on the clamping rod 21.

In one embodiment the clamping reducer 60 and the electromechanical energy converter 80 form a single system. In this system the clamping reducer 60 can rotate freely on the clamping rod 21.

In another embodiment, the clamping reducer 60 and the electromechanical energy converter 80 are rotationally coupled by a mechanical motion transmission system. The mechanical motion transmission system enables the electromechanical energy converter 80 to be disposed at the required location. Moreover, the clamping reducer is free to rotate on the clamping rod 21. In this embodiment, the mechanical motion transmission system is a flexible cable 90 in a sheath 91. The sheath 91 is supported at one end by the electromechanical energy converter 80 and at the other end by a casing 63 of the clamping reducer 60.

In a second type of embodiment of the speed reducer system, the speed reducer system includes two speed reducers:

a speed reducer referred to as the clamping speed reducer which guides rotation of the movable cam 23; said clamping reducer 60 is mounted to rotate freely on the clamping rod 21; and a speed reducer referred to as the converter reducer 81 which is driven directly by the electromechanical energy converter 80.

In this type of embodiment the clamping reducer 60, the converter reducer 81 and the electromechanical converter 80 form a single system. In this system the clamping reducer 60 rotates freely on the clamping rod 21.

In other embodiments, the clamping reducer 60, on the one hand, and the converter reducer 81 with the electromechanical energy converter 80, on the other hand, are rotationally coupled by a mechanical motion transmission system. In this mechanical motion transmission system the electromechanical energy converter 80 with the converter reducer 81 can be placed at the required location and the clamping reducer 60 rotates freely on the clamping rod 21.

The clamping device 3 in accordance with the invention shown in FIGS. 1 and 2 includes a speed reducer system which is made up of a clamping reducer 60 and a converter reducer 81. The converter reducer 81 is driven directly by the electromechanical energy converter 80 and the combination of these two members forms a gear motor 82.

The gear motor 82, i.e. the combination of the clamping reducer 60, on the one hand, and the converter reducer 81 with the electromechanical energy converter 80, on the other hand, is rotationally coupled by a mechanical motion transmission system. This mechanical motion transmission system is a flexible cable 90 in a sheath 91. The sheath 91 is supported at one end by the gear motor 82 and at the other end by a casing 63 of the clamping reducer 60.

The clamping reducer 60 is a mechanical worm wheel and worm screw reducer and is mounted in a one-piece casing 63. The casing 63 is made up of a casing unit 64 and a casing unit 65.

The casing unit 64 receives the worm wheel 61 of the reducer, which turns freely on a journal 66 of the casing body 64. Also, the journal 66 has a hole 67 in it through which the clamping rod 21 passes, the clamping rod passing freely through the casing unit 64. The casing unit 64 has a bottom wall 68 which has an inside face 69 and an outside face 70. The outside face 70 receives the worm wheel 61 which is pressed against it and the inside face 69 is pressed against the outside face 18 of the upright 14 of the support member 2. Also, the inside face 69 is provided with a guide tongue 30 that extends into the slot 20 of the leg 14 and the outside face 71 of the casing unit 64 is equipped with two fins 72.

The casing unit 65 receives the screw 62 which turns freely in the casing unit 65. The casing unit 65 terminates at one end in a circular end-piece 78 whose axis is the axis of the screw 62, with a housing 79. The screw 62 includes two journals 75 and 76 which are mounted in corresponding bearings 73 and 74 in the casing unit 65 of the screw 62. The combination of the screw with its bearings 73 and 74 is closed by a closure ring 100.

The worm wheel 61 which is mounted in the casing 64 includes a hole 96 through which the clamping rod 21 passes and the worm wheel 61 rotates freely on the clamping rod 21. The worm wheel 61 has an inside face 97 which is pressed against the outside face 70 of the bottom wall 68 and an outside face 98 on which there is a diametrical groove 99.

The cam-type immobilizing system 5 includes the movable cam 23 which is driven in rotation by the worm wheel 61 by means of a diametrically extending tenon 42 on the inside face 27 of the movable cam 23. The dimensions of the diametrically extending tenon 42 are such that it engages in the diametrically extending groove 99 on the outside face 98 of the worm wheel 61. Also, the movable cam 23 has a hole 29 in it through which the clamping rod 21 passes and the movable cam 23 can rotate freely on the clamping rod 21.

The fixed cam 22 is rotationally coupled to a base 54 by studs 41 at the periphery of the outside face 24 of the fixed cam 22. The studs 41 engage in notches 59 on the inside face 55 of the base 54. Also, the fixed cam 22 has a hole 28 in it through which the clamping rod 21 passes freely.

The base 54 is provided at its periphery with an axially extending connecting rod 58 which has the necessary length to engage between the two fins 72 on the outside face 71 of the casing unit 64 of the worm wheel 61 of the clamping reducer 60. The base 54 is therefore connected to the casing unit 64. The casing unit 64 is itself prevented from rotating with respect to the support member 2 by the tongue 30 which engages and slides in the slot 20 in the leg 14 of the support member 2. The base 54 has a hole 57 in it through which the clamping rod 21 passes freely through the base 54.

In this embodiment, the bearing member 48 is a flange at the end of the clamping rod 21. The bearing face 52 of the flange is pressed against the outside face 56 of the base 54. To be more precise, in the embodiment shown in FIG. 2, this flange takes the form of a hexagonal screw head. The bearing member 49 is a washer which is retained and adjusted by a nut 53. The nut 53 is screwed onto the screwthreaded end 47 of the clamping rod 21. The bearing member 49 includes a guide tongue 50 that extends into slot 19 of the leg 13. On the other hand, the casing unit 64 of the worm wheel 61 of the clamping reducer 60 has on its inside face 69 the guide tongue 30 that extends into slot 20 of the leg 14.

The mechanical motion transmission system is a flexible cable 90 in a sheath 91. The sheath 91 is supported at one end by the reducer 81, i.e. by the gear motor 82, and at the other end by the casing 63 of the clamping reducer 60. To be more precise, the sheath 91 has an end-piece 94 which engages in a housing 84 of an end-piece 83 of the reducer 81 and the sheath 91 has an end-piece 95 which engages in the housing 79 of the end-piece 78 of the screw casing unit 65. The cable 90 terminates in a square end 92 which engages in a square hole of the motion output of the reducer 81, and the cable 90 has another square end 93 which engages in a square hole 77 (FIG. 2) in the journal 76 of the screw 62.

Figure 3:
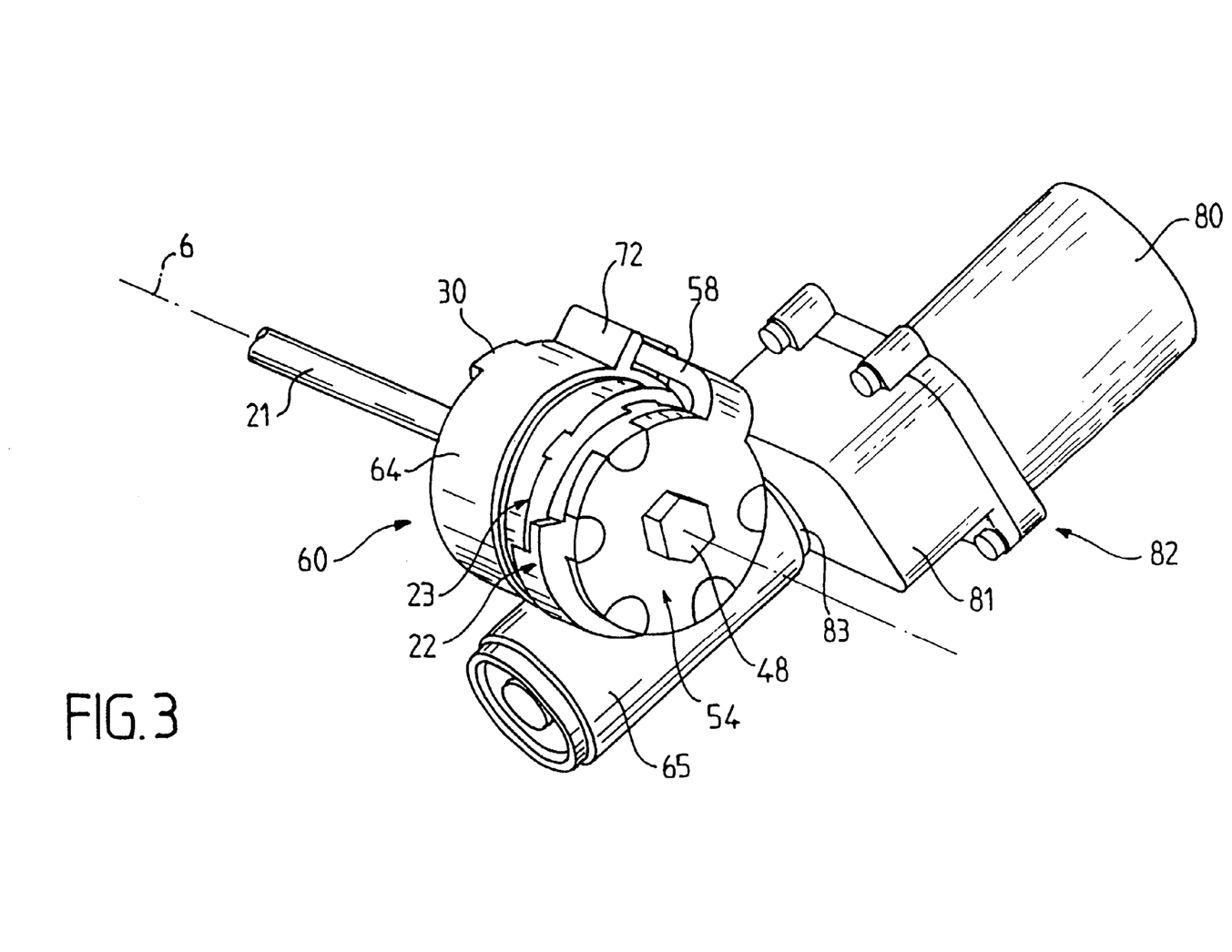
FIG. 3 is a perspective view of another embodiment of the invention.

In the embodiment shown in FIG. 3, the gear motor 82, i.e. the combination of the clamping reducer 60, the converter reducer 81 and the electromechanical energy converter 80, forms a single unit. The end-piece 83 of the gear motor 82, i.e. of the converter 81, mounts directly in the housing 79 of the end-piece 78 of the screw casing unit 65.

In the FIG. 5 assembly, the electromechanical energy converter 80 with its converter reducer 81, i.e. the combination forming the gear motor 82, controls the clamping reducer 60 directly. In this case, the casing of the reducer 81 has a lateral end-piece 86 which engages in the housing 79 of the end-piece 78 of the casing of the screw casing unit 65.

In FIG. 6, the gear motor unit 82 includes the electromechanical energy converter 80 with the converter reducer 81. The converter reducer 81 has a lateral end-piece 86 with a housing 87. The housing 87 receives the end of the sheath 91 supporting the cable 90. The other end of the sheath 91 enters the housing 79 of the end-piece 78 of the screw casing unit 65 which is part of the clamping reducer 60.

In both the embodiments shown in FIGS. 5 and 6 the gear motor 82 can comprise only the electromechanical energy converter 80, without being equipped with any reducer 81.

The embodiments described above apply to an automobile vehicle steering column in which the member 1 is a body-tube 7 with its reinforcing bracket 8 and the support member 2 is mounted on the bodyshell of the automobile vehicle. In all of these embodiments, rotation of the movable cam 23 relative to the stationary cam 22 produces axially extending separation of the cams relative to the fixed distance between the bearing members 48 and 49, thereby to displace the legs 13 and 14 together into clamping engagement with the adjustable member 1.

Figure 7:
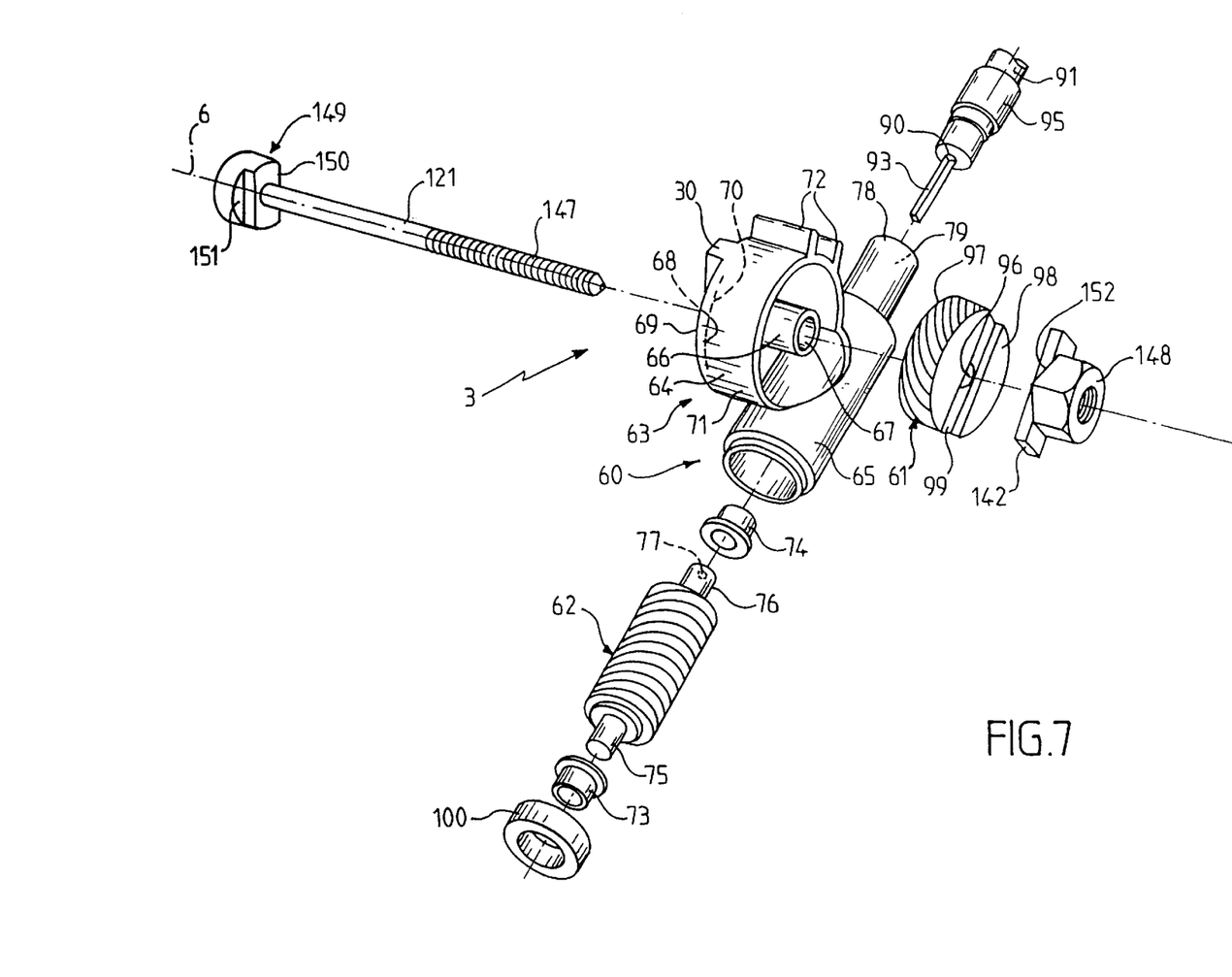
FIG. 7 is an exploded perspective view similar to FIG. 2 of another embodiment of the invention.

In the embodiment shown in FIG. 7, the clamping device 3 includes a clamping rod 121 with a nut 148 which is locked or unlocked by an electrical remote control system.

The clamping rod 121 has outside the legs 13 and against an outside face 17 of said leg 13 a bearing member 149 connected to and substantially perpendicular to the clamping rod 121. The clamping rod 121 is prevented from rotating about the clamping axis 6 by the bearing member 149. The clamping rod has at its other end a screwthreaded part 147 which cooperates with the nut 148 which is outside the other leg 14. The nut 148 is moved to the locked or unlocked position by the electrical remote control system.

The clamping reducer 60 is a mechanical worm wheel and worm screw reducer mounted in a one-piece casing 63 comprising:

a casing housing or body 64 containing the worm wheel 61, which rotates freely on a journal 66 of the casing housing 64 which is provided with a hole 67 through which the clamping rod 121 passes; and a casing body 65 housing the screw 62, which rotates freely in the casing body 65.

The nut 148 is driven in rotation by the worm wheel 61 by means of a diametrically extending tenon 142 on the inside bearing face 152 of the nut 148, said diametrically extending tenon 142 engaging in a diametrically extending groove 99 on the outside face 98 of the worm wheel 61.

The bearing member 148 consists of the nut mounted and screwed on the screwthreaded end 147 of the clamping rod 121, said nut 148 being pressed against the outside face 98 of the worm wheel 61. The bearing member 149 is a flange at the end of the clamping rod 121, said flange 149 being pressed against the outside face 17 of the leg 13. The bearing member 149 includes a guide tongue 150 in a slot 19 of the leg 13 and the casing unit 64 of the worm wheel 61 of the clamping reducer 60 has on its inside face 69 a guide tongue 30 in a slot 20 of the leg 14.

The embodiment shown in FIG. 7 can, like the embodiment shown in FIG. 2, be combined with all possible embodiments of the invention described previously.

Accordingly, when the worm wheel 61 turns, it screws or unscrews the nut 148 on the clamping rod 121 and consequently moves the legs 13 and 14 of the support member 2 closer together or farther apart to clamp or release the body-tube 7 of the steering column.

What we claim is:

1. A clamping system for angularly adjusting the position of a movable first member (1) relative to a stationary second member (2), comprising:

(a) a stationary generally U-shaped support member (2) having a generally horizontal base portion (12), and a pair of downwardly depending vertical clamping leg portions (13 and 14) each having a lower free end;

(b) a movable member (1) arranged transversely between said clamping leg portions;

(c) means pivotally connecting said movable member between said vertical leg portions, including a stationary horizontal clamping rod (21) extending between aligned openings (19, 20; 10) contained in said leg portions and in said movable member, respectively, said clamping leg end portions normally having released positions permitting pivotal movement of said movable member relative to said support member;

(d) rotatably operable clamping means (3; 148) operable to displace said clamping leg lower ends inwardly together from said released positions toward clamping positions in engagement with said movable member, respectively, said clamping means including first and second bearing means arranged on said clamping rod on opposite sides of said stationary member, respectively; and (e) drive means including speed reducer means (60) for operating said clamping means to displace said leg end portions between said released and clamping positions, respectively.

2. A clamping device as defined in claim 1, wherein said clamping means comprises cam means including:

(a) a circular fixed cam prevented from rotating with respect to one leg of said support member; and (b) a circular movable cam free to rotate on said clamping rod, said clamping rod passing freely through said fixed and movable cams.

3. A clamping device as defined in claim 2, and further wherein:

(c) said fixed cam includes a plurality of teeth each comprising a peak, a valley, and two flanks, each of the two flanks having a slope adapted to load the clamping means progressively;

(d) said movable cam having the same number of teeth as said fixed cam, each tooth of said movable cam having a peak, a valley and two flanks, each of the said flanks being adapted to cooperate with a corresponding flank of the fixed cam to assure an unlocked condition of the first member and to load the clamping device progressively;

(e) the peak of each tooth of said movable cam cooperating with a corresponding valley of said fixed cam to procure the released condition of said movable first member;

(f) the peaks of the teeth of the said cams cooperating together to maintain said movable member in said clamped condition.

4. A clamping device as defined in claim 1, wherein said clamping rod is prevented from rotating about its axis by said second bearing member; and wherein said clamping rod comprises a screw threaded part which cooperates with a nut (148) outside the said second leg, said nut constituting said first bearing member.

5. A clamping device as defined in claim 4, wherein said clamping reducer comprises a mechanical worm wheel and worm screw reducer mounted in a one-piece casing, comprising:

(a) a first casing body accommodating the worm wheel which turns freely on a journal of the first casing unit which has a hole in it through which the clamping rod passes; and (b) a second casing body accommodating the screw, which turns freely in the second casing body; said nut being driven in rotation by the worm wheel by means of a diametrically extending tenon on a bearing face of the nut and which engages in a diametrically extending groove on a corresponding face of the worm wheel.

6. A clamping device as defined in claim 5, wherein:

(c) the nut constituting the first bearing means is pressed against of the worm wheel; and (d) the second bearing means comprises a flange at an end of said clamping rod and is pressed against said second leg;

(e) said second bearing member includes a tongue guided in a slot contained in said second let, and the first casing unit accommodating the worm wheel is provided with a tongue guided in a slot contained in said first leg.

7. A clamping device as defined in claim 1, wherein the speed reducer means includes a clamping reducer which drives the clamping means into rotation and which is mounted to rotate freely on said clamping rod.

8. A clamping device as defined in claim 7, wherein said clamping reducer and said electromechanical energy converter form a single system.

9. A clamping device as defined in claim 7, wherein said clamping reducer and said electromechanical energy converter are rotationally linked by a mechanical motion transmission system so that the electromechanical energy converter can be placed at a required location remote from said clamping reducer.

10. A clamping device as defined in claim 9, wherein said mechanical motion transmission system comprises a flexible cable in a sheath supported at one end by said electromechanical energy converter and at the other end by a casing of said clamping reducer.

11. A clamping device as defined in claim 1, wherein said speed reducer means includes two speed reducers, including:

(a) a clamping reducer which drives said clamping means into rotation and is mounted to rotate freely on said clamping rod; and (b) a converter reducer which is driven directly by an electromechanical energy converter (80).

12. A clamping device as defined in claim 11, wherein said clamping reducer, said converter reducer and said electromechanical energy converter form a single system.

13. A clamping device as defined in claim 11, wherein said clamping reducer, on the one hand, and said converter reducer with the electromechanical energy converter, on the other hand, are rotationally coupled by a mechanical motion transmission system so that said electromechanical energy converter, with said converter reducer, can be placed at a required location remote from the clamping reducer.

14. A clamping device as defined in claim 13, wherein said the clamping reducer comprises a mechanical worm wheel and worm screw reducer mounted in a one-piece casing, comprising:

(a) a first casing housing accommodating the worm wheel which turns freely on a journal of the casing unit provided with a hole through which the clamping rod passes; and (b) a second casing body accommodating the screw, which turns freely in the second casing unit;

(c) said cam means includes:

(1) a movable cam, which is driven in rotation by the worm wheel by means of a diametrically extending tenon on the said movable cam and engaging in a diametrically extending groove on said worm wheel, said movable cam having a hole in it through which the clamping rod passes; and (2) a fixed cam, which is prevented from rotating with respect to a disc mounted on the clamping rod, by means of studs on the periphery of the fixed cam, said studs engaging in notches on said disc, said fixed cam having a hole in which through which the clamping rod passes;

(3) said disc being provided at its periphery with an axially extending connecting rod having a required length to engage between two fins on the first casing unit accommodating the worm wheel to connect the disc to the first casing unit which is prevented from rotating with respect to the support member, said disc having a hole in it through which the clamping rod passes.

15. A clamping device as defined in claim 14, wherein:
(d) said first bearing means comprises a flange at one end of said clamping rod and pressed against said disc; and
(e) said second bearing means comprises a washer held and adjusted by a nut screwed onto the screw threaded end of said clamping rod, said second bearing means including a tongue guided in a slot of the second leg and the first casing body accommodating the worm wheel being provided with a tongue guided in a slot in said first leg.

16. A clamping device as defined in claim 14, wherein said mechanical motion transmission system comprises a flexible cable in a sheath supported at a first end by said converter reducer and at a second end by the body of said clamping reducer.

17. A clamping device as defined in claim 14, wherein said clamping reducer, said converter reducer and said electromechanical energy converter form a single unit, and further wherein an end-piece of said converter reducer is mounted directly in said housing body of said clamping reducer.

18. A clamping device as defined in claim 1, wherein said electromechanical energy converter is an electric motor.

19. A clamping device as defined in claim 1, wherein said electromechanical energy converter is an electromagnetic system.

20. A clamping device as defined in claim 1, wherein said electromechanical energy converter is remotely controlled by a two-position electrical switch.

21. A clamping device as defined in claim 1, wherein said electromechanical energy converter is remotely controlled by a push button whose non-depressed position is a rest position and each depression of which locks said clamping device when it is in a released position or unlocks it when it is in a clamped position.

22. A clamping device as defined in claim 1, wherein said electromechanical energy converter is remotely controlled by the ignition key of an automobile vehicle.

23. A clamping device as defined in claim 1, and further comprising an indicating means providing information on the clamped or released condition of said movable member, said information comprising a luminous signal.

24. A clamping device as claimed in claim 1, further comprising indicating means providing information on the clamped or released condition of said first member, said information comprising a written message on a screen.

25. A clamping device as defined in claim 1, and further including an automobile vehicle steering column in which said movable member is mounted, said movable member comprising a body tube with a reinforcing bracket, and said support member is mounted on said body shell of the vehicle.

* * * * *